(12) United States Patent
Jeon et al.

(10) Patent No.: US 12,526,648 B2
(45) Date of Patent: Jan. 13, 2026

(54) APPARATUS AND METHOD FOR CHANNEL SOUNDING

(71) Applicant: SAMSUNG ELECTRONICS CO., LTD., Suwon-si (KR)

(72) Inventors: Eunsung Jeon, Seoul (KR); Myeongjin Kim, Seongnam-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 853 days.

(21) Appl. No.: 17/660,056

(22) Filed: Apr. 21, 2022

(65) Prior Publication Data

US 2022/0345904 A1  Oct. 27, 2022

Related U.S. Application Data

(60) Provisional application No. 63/178,155, filed on Apr. 22, 2021.

(30) Foreign Application Priority Data

Jul. 13, 2021 (KR) ........................ 10-2021-0091692

(51) Int. Cl.
  *H04W 16/28* (2009.01)
  *H04B 7/0417* (2017.01)
  (Continued)

(52) U.S. Cl.
  CPC .......... *H04W 16/28* (2013.01); *H04B 7/0417* (2013.01); *H04B 7/0617* (2013.01); *H04W 84/12* (2013.01)

(58) Field of Classification Search
  CPC . H04L 25/0224; H04L 5/0055; H04L 1/0058; H04L 5/0046; H04B 17/318; H04W 24/10; H04W 24/06; H04W 24/20
  See application file for complete search history.

(56) References Cited

U.S. PATENT DOCUMENTS 7,693,551 B2  4/2010 Ojard
8,982,980 B2  3/2015 Zhang
(Continued)

OTHER PUBLICATIONS

Extended European Search Report dated Sep. 14, 2022 in corresponding European Patent Application No. 22169587.7 (10 pages).
(Continued)

*Primary Examiner* — Iqbal Zaidi
(74) *Attorney, Agent, or Firm* — Morgan, Lewis & Bockius LLP

(57) ABSTRACT

A method of communication performed by a first apparatus with respect to a second apparatus in a wireless local area network (WLAN) system including the first apparatus and the second apparatus, includes: transmitting a null data packet (NDP) based on a first protocol standard to the second apparatus; receiving a first feedback frame including information on an estimated first channel and phase information from the second apparatus in response to the NDP; performing beamforming with respect to the second apparatus by reflecting the phase information in the information on the estimated first channel; and transmitting a beamformed physical layer protocol data unit (PPDU) to the second apparatus.

20 Claims, 15 Drawing Sheets

(51) Int. Cl.
 *H04B 7/06* (2006.01)
 *H04W 84/12* (2009.01)

(56) References Cited

U.S. PATENT DOCUMENTS

| | | |
|---|---|---|
| 10,116,359 B2 | 10/2018 | Cao et al. |
| 10,897,285 B2 | 1/2021 | Vermani et al. |
| 10,924,170 B2 | 2/2021 | Hauzner et al. |
| 12,231,267 B2 * | 2/2025 | Merlin ............... H04B 17/318 |
| 2014/0064221 A1 | 3/2014 | Van Zelst et al. |
| 2017/0170885 A1 | 6/2017 | Li et al. |
| 2017/0331534 A1 | 11/2017 | Jiang et al. |
| 2020/0091970 A1 | 3/2020 | Lee et al. |
| 2020/0106492 A1 | 4/2020 | Cao et al. |
| 2021/0281303 A1 | 9/2021 | Jeon et al. |
| 2021/0288779 A1 * | 9/2021 | Da Silva ........... H04W 72/0473 |
| 2023/0096177 A1 * | 3/2023 | Yu ....................... H04L 25/0224 |

OTHER PUBLICATIONS

Deng, et al., "IEEE 802.11be—Wi-Fi 7: New Challenges and Opportunities", arXiv preprint arXiv:2007.13401v3 [eess. SP] Aug. 3, 2020, 30 pages.

Jeon, et al., "Joint Beamformer and Beamformee Design for Channel Smoothing in WLAN Systems", 2020 IEEE 92nd Vehicular Technology Conference (VTC2020-Fall), 7 pages.

Part 11: Wireless LAN Medium Access Control (MAC) and Physical Layer (PHY) specifications, IEEE P802.11n/D11.0, Jun. 2009, 560 pages.

Sadowsky, et al., "WWiSE Preambles and MIMO Beamforming?", Jan. 2005, doc.: IEEE 802.11-05/1635r1, 28 pages.

* cited by examiner

FIG. 9

| Order | Information |
|---|---|
| 1 | Category |
| 2 | EHT Action |
| 3 | EHT MIMO Control |
| 4 | EHT Compressed Beamforming Report |
| 5 | EHT MU Exclusive Beamforming Report |
| 6 | EHT CQI Report |
| 7 | EHT Smooth Beamforming Report |

FIG. 10

| Nc Index | Nr Index | BW | Grouping | Codebook Information | Feedback Type | Remaining Feedback Segments | First Feedback Segments | Partial BW Info | Sounding Dialogue Token Number | Smooth Beamformed | Reserved |
|---|---|---|---|---|---|---|---|---|---|---|---|
| B0 B3 | B4 B7 | B8 B10 | B11 | B12 | B13 B14 | B15 B17 | B18 | B19 B27 | B28 B33 | B34 | B35 B39 |
| 4 | 4 | 4 | 1 | 1 | 2 | 3 | 1 | 9 | 6 | 1 | 5 |

Bits: 4

FIG. 11

| Size of V | Number of angles | The order of angles Smooth Beamforming Information subfield for subcarrier k, where k=scid(0), scid(1), ⋯, scid($N_s$−1) |
|---|---|---|
| $N_{rx} \times N_c$ | $N_c$ | $\phi_{N_{rx}1}(k), \phi_{N_{rx}2}(k), \ldots, \phi_{N_{rx}N_c}(k)$ |

FIG. 12

| Subfield | Definition | Encoding |
|---|---|---|
| Smooth Beamforming Feedback | For an AP, indicates support for the reception of smooth beamforming information feedback. For a non-AP STA, indicates support for the transmission of smooth beamforming information feedback. | Set to 0 if not supported. Set to 1 if supported. |

APPARATUS AND METHOD FOR CHANNEL SOUNDING

CROSS-REFERENCE TO RELATED APPLICATIONS

This application is based on and claims priority under 35 U.S.C. § 119 to Korean Patent Application No. 10-2021-0091692, filed on Jul. 13, 2021, in the Korean Intellectual Property Office, and U.S. Provisional Application No. 63/178,155, filed on Apr. 22, 2021, in the United States Patents and Trademark Office, the disclosures of which are incorporated by reference herein in their entireties.

TECHNICAL FIELD

This disclosure relates generally to wireless communication, and more particularly, to an apparatus and a method for channel sounding in a wireless local area network (WLAN).

DISCUSSION OF THE RELATED ART

A wireless local area network (WLAN) wirelessly connects two or more devices to each other and typically to the Internet, in a local environment such as a home, an office building, a campus, an aircraft, watercraft, etc. WLAN technology may be based on an institute of electrical and electronics engineers (IEEE) 802.11 standard. The 802.11 standard has evolved into versions 802.11b, 802.11a, 802.11g, 802.11n, 802.11ac, and 802.11ax and may support a transmission rate of up to 1 Gbyte/s based on orthogonal frequency-division multiplexing (OFDM) technology.

In 802.11ac, data may be simultaneously transmitted to multiple users through a multi-user multi-input multi-output (MU-MIMO) technique. In addition, 802.11be, referred to as extremely high throughput (EHT), and the next-generation protocol standard (hereinafter, referred to as EHT+) following EHT intend to implement support of a 6 GHz unlicensed frequency band, bandwidth utilization of up to 320 MHz per channel, introduction of hybrid automatic repeat and request (HARQ), support of up to 16×16 MIMO, and so on.

In addition, a beamforming process may be used to improve communication performance in the MU-MIMO communication environment. Specifically, a "beamformer" (e.g., an access point) that performs the beamforming process may perform beamforming based on feedback regarding a channel received from a "beamformee" (e.g., station). The beamformer may generate a plurality of beamformed beams using a beamforming matrix for each subcarrier represented by an OFDM symbol. The beamformer may provide a beamformed signal to the beamformee. If the beamformee performs a channel smoothing operation on the received signal, when there is "discontinuity" between beamforming matrices corresponding to adjacent subcarriers among subcarriers of the signal (typically a much larger than expected change between the adjacent subcarriers), a loss of discontinuous components may cause a reduction in energy of the signal, increasing the probability of a higher packet error rate (PER). For this reason, the beamformer may not perform a separate channel smoothing operation on the beamformed signal.

SUMMARY

Embodiments of the inventive concept provide an apparatus and a method for channel sounding that reduces discontinuity between beamforming matrices corresponding to adjacent subcarriers such that a beamformer in a wireless communication system may perform a channel smoothing operation on a beamformed signal.

According to an aspect of the inventive concept, there is provided a method performed by a first apparatus for communicating with a second apparatus in a wireless local area network (WLAN) system including the first apparatus and the second apparatus. The method includes: transmitting a null data packet (NDP) based on a first protocol to the second apparatus; receiving a feedback frame including information on an estimated channel and phase information from the second apparatus in response to the first NDP; performing beamforming with respect to the second apparatus by reflecting the phase information in the information on the estimated first channel; and transmitting, by the first apparatus, a beamformed first physical layer protocol data unit (PPDU) to the second apparatus.

According to another aspect of the inventive concept, there is provided a method performed by a second apparatus, for communicating with a first apparatus in a wireless local area network (WLAN) system including the first apparatus and the second apparatus, the method including: receiving a null data packet (NDP) including a plurality of subcarriers based on a preset protocol from the first apparatus; estimating a channel with respect to the first apparatus based on the NDP; performing singular value decomposition of the estimated channel; generating angle information of a beam steering matrix for each subcarrier and channel smoothing-related phase information based on a result of the singular value decomposition; and transmitting a feedback frame including the angle information and the channel smoothing-related phase information to the first apparatus.

According to another aspect of the inventive concept, there is provided a first apparatus communicating with a second apparatus in a wireless local area network system, the first apparatus including a transceiver, and a processing circuit configured to receive a feedback frame including information on an estimated channel and phase information as a response to a null data packet based on an extremely high throughput protocol from the second apparatus through the transceiver and configured to perform beamforming with respect to the second apparatus by reflecting the phase information in the information on the estimated channel.

According to another aspect of the inventive concept, there is provided a second apparatus communicating with a first apparatus in a wireless local area network system, the second apparatus including a transceiver, and a processing circuit configured to estimate a channel with the first apparatus based on a null data packet including a plurality of subcarriers according to an extremely high throughput protocol standard and configured to generate angle information of a beam steering matrix for each subcarrier and channel smoothing-related phase information by performing singular value decomposition of the estimated channel and configured to transmit a feedback frame including the angle information and the channel smoothing-related phase information to the first apparatus through the transceiver.

BRIEF DESCRIPTION OF THE DRAWINGS

Embodiments of the inventive concept will be more clearly understood from the following detailed description taken in conjunction with the accompanying drawings in which:

FIG. 9 is a table illustrating information included in a feedback frame according to an example embodiment of the inventive concept, and FIG. 10 is a diagram illustrating a configuration of an "extremely high throughput (EHT) multi-input multi-output (MIMO) control" field of FIG. 9;

FIG. 11 is a table specifically illustrating phase information located in an "EHT smooth beamforming report" field of FIG. 9;

FIG. 12 is a table illustrating a subfield of an "EHT PHY capabilities information" field indicating whether or not smooth beamforming feedback is supported according to embodiments of the inventive concept;

DETAILED DESCRIPTION OF THE EMBODIMENTS

Figure 1:
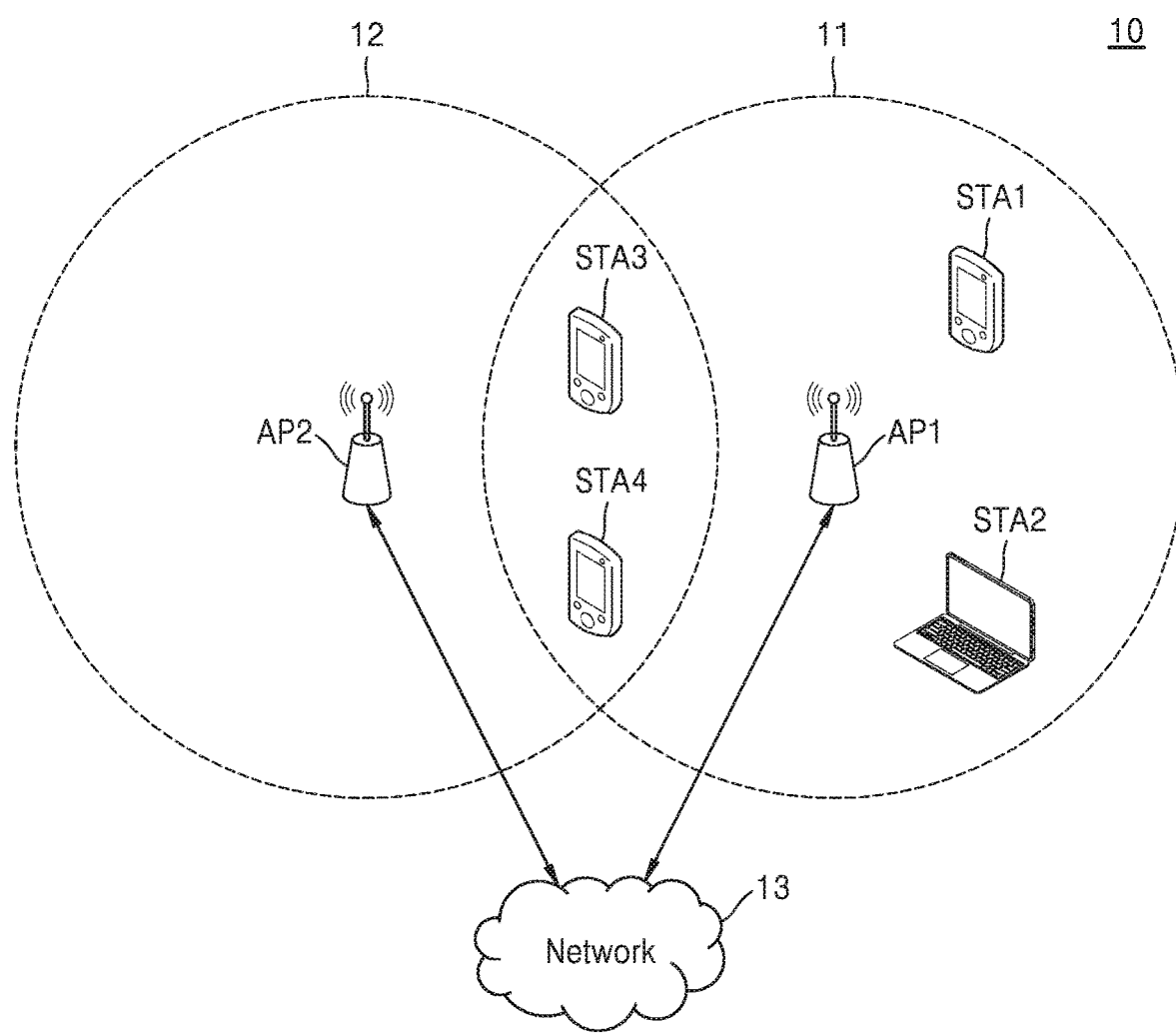
FIG. 1 is a diagram illustrating a wireless communication system according to an example embodiment of the inventive concept.

Advantages and features of the inventive concept and a method of obtaining the same will become apparent with reference to the embodiments described below in detail in conjunction with the accompanying drawings. However, the inventive concept is not limited to the embodiments described below and may be implemented in a variety of different forms. Like reference numerals refer to like components throughout this description.

In describing the embodiments of the inventive concept in detail, orthogonal frequency division multiplexing (OFDM) or orthogonal frequency division multiple access (OFDMA)-based wireless communication systems, in particular, an institute of electrical and electronics engineers (IEEE) 802.11 standard will be mainly targeted, but the subject matter of the inventive concept may be applicable to other communication systems (for example, cellular communication systems such as long term evolution (LTE), LTE-advanced (LTE-A), new radio (NR), wireless broadband (WiBro), and global system for mobile communication (GSM), or short-distance communication systems such as Bluetooth and near field communication (NFC) having a similar technical background and channel type with slight modifications within the scope of the inventive concept as understood by a person skilled in the art.

FIG. 1 is a diagram illustrating a wireless communication system 10 according to an example embodiment of the inventive concept. FIG. 1 illustrates a wireless local area network (WLAN) system as an example of the wireless communication system 10. The wireless communication system 10 includes first and second access points AP1 and AP2, a first station STA1, a second station STA2, a third station STA3, and a fourth station STA4. The first and second access points AP1 and AP2 may connect to a network 13 including the Internet, an Internet protocol (IP) network, or any other network. The first access point AP1 may provide the first station STA1, the second station STA2, the third station STA3, and the fourth station STA4 with an access to the network 13 within a first coverage region 11, and the second access point AP2 may provide the third station STA3 and the fourth station STA4 with an access to the network 13 within a second coverage region 12. In some embodiments, the first access point AP1 and the second access point AP2 may communicate with at least one of the first station STA1, the second station STA2, the third station STA3, and the fourth station STA4 based on wireless fidelity (WiFi) or any other WLAN access technology.

The access point may be referred to as a router, a gateway, etc., and the station may be referred to as a mobile station, a subscriber station, a terminal, a mobile terminal, a wireless terminal, user equipment, a user, etc. Some examples of the station include a portable device, such as a mobile phone, a laptop computer, a wearable device, and a stationary device such as a desktop computer, or a smart television (TV). In the following description, the access point may be referred to as a first apparatus, and the station may be referred to as a second or third apparatus.

The first and second access points AP1 and AP2 may allocate at least one resource unit to at least one of the first to fourth stations STA1 to STA4. The first and second access points AP1 and AP2 may transmit data through at least one allocated resource unit, and at least one station may receive data through at least one allocated resource unit. In 802.11ax, the first and second access points AP1 and AP2 may allocate only one resource unit to at least one station, and in 802.11be (hereinafter, referred to as extremely high throughput (EHT)) or next-generation IEEE 802.11 standards (hereinafter, referred to as EHT+), the first and second access points AP1 and AP2 may allocate a multi-resource unit (MRU) including two or more resource units to at least one station. For example, the first access point AP1 may allocate the MRU to at least one of the first to fourth stations STA1 to STA4 and may transmit data through the allocated MRU.

In one example embodiment, the first and second access points AP1 and AP2 may communicate with at least one of the first to fourth stations STA1 to STA4 by using a beamforming technique. For example, single-user beamforming may improve reception performance of a single user, and multi-user beamforming may improve reception performance of all multiple users by removing interference between multiple users. The first and second access points AP1 and AP2 and the first to fourth stations STA1 to STA4 may perform channel sounding for beamforming, and the channel sounding may be based on a sounding protocol. As described below, even when the first and second access points AP1 and AP2 perform channel sounding with the first to fourth stations STA1 to STA4 that support various wireless communication standards (for example, EHT, EHT+, etc.), the first and second access points AP1 and AP2 and the first to fourth stations STA1 to STA4 may efficiently perform the channel sounding. Hereinafter, embodiments of channel sounding between the first access point AP1 and the first station STA1 is described; the same concepts may be applied to the second access point AP2 and the second to fourth stations STA2 to STA4.

The first access point AP1 may transmit a null data packet (NDP) based on a preset protocol standard to the first station STA1. The first station STA1 may estimate a channel with the first access point AP1 in response to the NDP and may generate "information on the estimated channel" and "phase information" from the estimated channel. Herein, such "phase information" may be referred to as channel smoothing-related phase information (e.g., obtained as values from a diagonal matrix as described below in conjunction with equations (1)-(9)). Hereinafter, the phase information generated by the first station STA1 may be provided to the first access point AP1 to maximally reduce loss that occurs when the first station STA1 performs channel smoothing on a beamformed signal from the first access point AP1. A method of generating the phase information of the first station STA1 may be based on the number of reception antennas of the first station STA1, which is described in detail below. The "information on the estimated channel" may include "angle information" (e.g., $\phi$ and $\psi$ obtained using a Givens rotation according to eqns. (4)-(6) below) of a beam steering matrix for each subcarrier, which is generated from a singular value decomposition (SVD) result of the channel estimated by the first station STA1. The first station STA1 may transmit a feedback frame including the information on the estimated channel and the phase information to the first access point AP1. The first access point AP1 may perform beamforming on the first station STA1 by reflecting the phase information in the information on the estimated channel. That is, the first access point AP1 may generate beamforming matrices in which discontinuity between adjacent subcarriers is reduced, by reflecting the phase information in the information on the estimated channel. Herein, a relationship between adjacent subcarriers may be interpreted as a relationship between matrices corresponding to the adjacent subcarriers. Details of the beamforming of the first access point AP1 are described below. The first access point AP1 may transmit a beamformed signal (or a physical layer protocol data unit (PPDU)) to the first station STA1. The first station STA1 may perform channel smoothing on the beamformed signal.

In addition, an embodiment in which phase information is transmitted or received between the first access point AP1 and the first station STA1 and beamforming is performed by using the phase information may be defined in a preset protocol standard. For example, the preset protocol standard may include an EHT protocol standard or an EHT+ protocol standard.

The first and second access points AP1 and AP2 according to the example embodiment of the inventive concept receive, from the first to fourth stations STA1 to STA4, phase information for maximally reducing loss due to channel smoothing on the beamformed signals of the first to fourth stations STA1 to STA4 and may use the phase information in beamforming. Through this, a positive effect of a channel smoothing operation of the first to fourth stations STA1 to STA4 on beamformed signals of the first and second access points AP1 and AP2 may be greatly enhanced.

Figure 2:
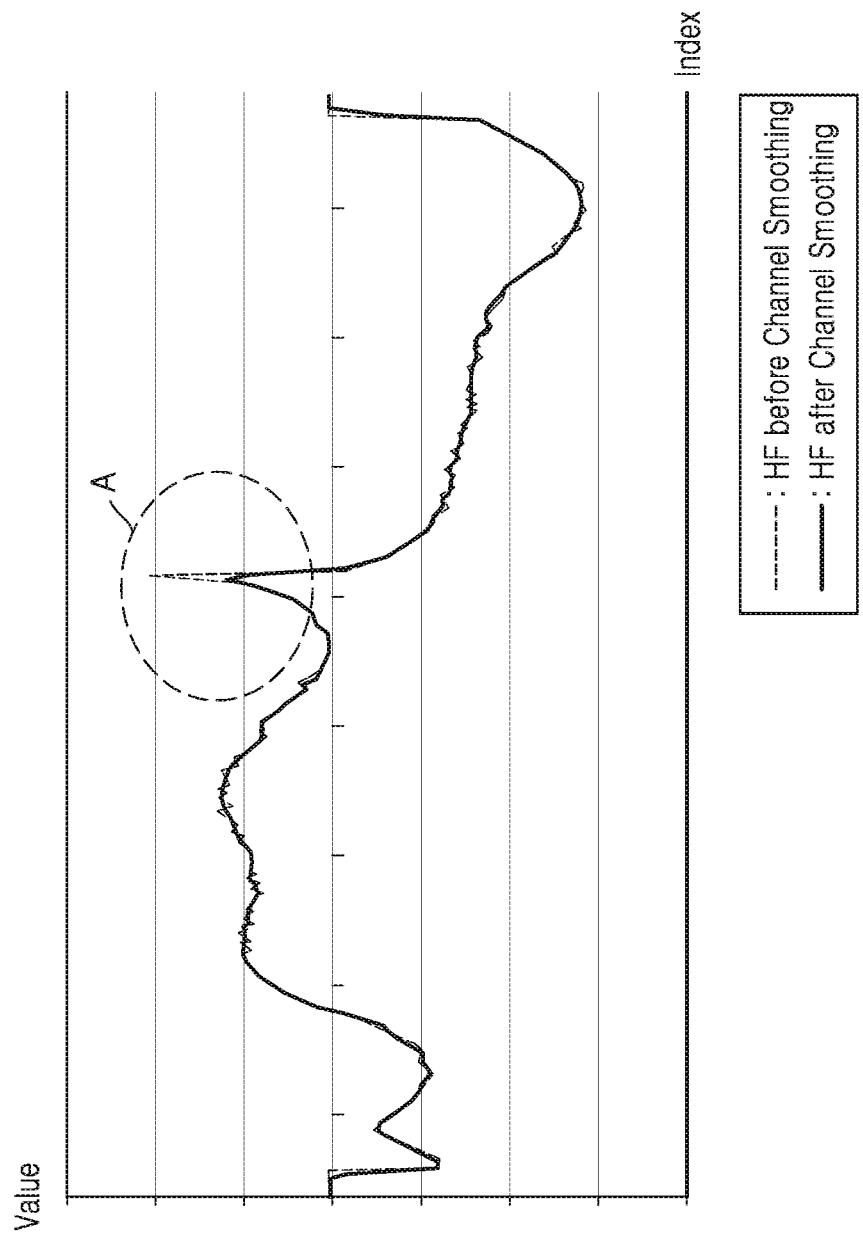
FIG. 2 is a diagram illustrating discontinuity of a beamforming matrix for each subcarrier corresponding to a signal beamformed from an access point in a comparative example.

FIG. 2 is a diagram illustrating a "discontinuity" of a beamforming matrix for each subcarrier corresponding to a beamformed signal from an access point in a comparative example.

Referring to FIG. 2, in the comparative example, the access point may perform beamforming on a station based on a feedback frame received from the station. In this case, as indicated by the dashed line (within region "A"), discontinuity between beamforming matrices HF corresponding to certain adjacent subcarriers may occur. When the station performs channel smoothing for the beamforming matrices HF having discontinuity, a large energy loss may occur as illustrated in FIG. 2. In order to prevent the loss from occurring, the access point may receive a feedback frame including certain phase information from the station and perform the beamforming on the station by using the phase information.

Figure 3:
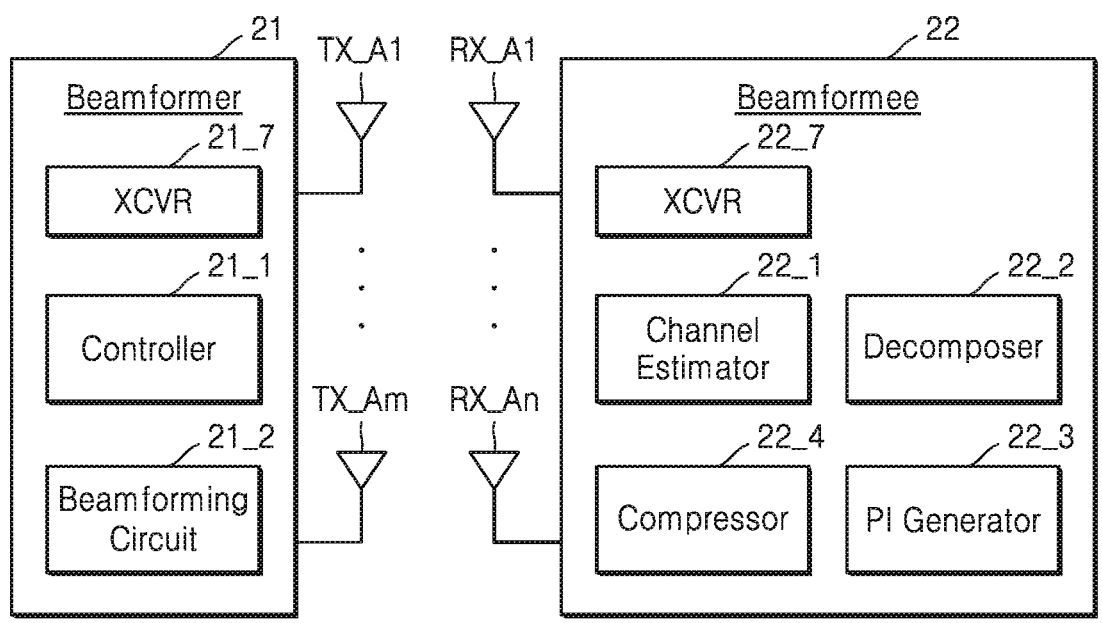
FIG. 3 is a block diagram illustrating a wireless communication system according to an example embodiment of the inventive concept.

FIG. 3 is a block diagram illustrating a wireless communication system 20 according to an example embodiment of the inventive concept. The block diagram of FIG. 3 illustrates a beamformer 21 and a beamformee 22 that communicate with each other in the wireless communication system 20. Each of the beamformer 21 and the beamformee 22 may be any apparatus that communicates in the wireless communication system 20 and may be referred to as an apparatus for wireless communication. In some embodiments, each of the beamformer 21 and the beamformee 22 may be an access point or a station of a WLAN system.

Referring to FIG. 3, the beamformer 21 may include a controller 21_1, a beamforming circuit 21_2, a transceiver 21_7, and a plurality of first antennas TX_A1 to TX_Am coupled to the transceiver 21_7. The controller 21_1 and the beamforming circuit 21_2 may be defined as processing circuits of the beamformer 21. The beamformee 22 may include a channel estimator 22_1, a decomposer 22_2, a phase information generator 22_3, a compressor 22_4, a transceiver 22_7, and a plurality of second antennas RX_A1 to RX_An coupled to the transceiver 22_7. The channel estimator 22_1, the decomposer 22_2, the phase information generator 22_3, and the compressor 22_4 may be defined as a processing circuit of the beamformee 22. Hereinafter, the beamformee 22 is described first.

The beamformee 22 may receive an NDP through the plurality of second antennas RX_A1 to RX_An. The channel estimator 22_1 may estimate a channel by using a reference signal included in the received NDP. In some embodiments, the NDP may also be referred to as a sounding packet. An NDP($y_k$) received by the channel estimator 22_1 for channel estimation may be represented as Equation 1.

$$y_k = H_k x_k + n_k \qquad \text{Equation 1:}$$

In Equation 1, $H_k$ is a channel matrix, $x_k$ is a transmission data stream, and $n_k$ represents thermal noise. k indicates a subcarrier index of a channel and may be in a range of 1 to $N_{FFT}$. Accordingly, in the channel matrix for each subcarrier, a size of $H_k$ may be Nr×Nt. Here, Nr is the number of second antennas RX_A1 to RX_An, and Nt is the number of first antennas TX_A1 to TX_Am. Each element of Equation 1 may be defined as a matrix or a vector. The transmission data stream $x_k$ may have a size of, for example, Ns×1. Here, Ns is the number of transmission streams. The thermal noise $n_k$ indicates white Gaussian noise. The thermal noise $n_k$ may have a size of Nr×1.

The channel estimator 22_1 may generate channel state information based on an estimated channel. The channel state information may include at least one of a channel quality indicator (CQI), a precoding matrix indicator (PMI), and a rank indicator (RI).

The decomposer 22_2 may perform singular value decomposition on a channel $\hat{H}_{est,k}$ estimated by the channel estimator 22_1 as represented in Equation 2.

$$\hat{H}_{est,k} = U_k \Sigma_k V_k^h \quad \text{Equation 2:}$$

In Equation 2, $U_k$ is a left singular matrix, and $V_k$ is a right singular matrix and may include a Hermitian operator. $\Sigma_k$ is a diagonal matrix including non-negative singular values.

A size of the left singular matrix $U_k$ may be Nr×Nss. A size of the right singular matrix $V_k$ may be Ntx×Nss. In addition, a size of $\Sigma_k$ may be Nss×Nss. The right singular matrix $V_k$ may be referred to as an initial beam steering matrix. In the wireless communication system 20 (for example, an IEEE 802.11n/ac/ax WLAN system) according to some embodiments, the beamformer 21 transmits a signal to the beamformee 22 through OFDM modulation in which $N_{FFT}$ subcarriers in one symbol are guaranteed to have orthogonality with each other. Thus, a channel estimation operation of the channel estimator 22_1 and a singular value decomposition operation of the decomposer 22_2 may be performed for each subcarrier.

In addition, to reduce feedback overhead transmitted to the beamformer 21, the decomposer 22_2 does not transmit the initial beam steering matrix $V_k$ to the beamformer 21 as is. Instead, the decomposer 22_2 may apply a first diagonal matrix D for performing a common phase shift to the initial beam steering matrix $V_k$ as in Equation 3.

$$Q_k = V_k D \quad \text{Equation 3:}$$

In Equation 3, $Q_k$ is a beam steering matrix, and the application of the first diagonal matrix D may allow an element of a last row of each column of the beam steering matrix $Q_k$ to have a real value. In one example, the first diagonal matrix D may have values $$\left( e^{-j\phi(N_{tx},1)}, \ldots, e^{-j\phi(N_{tx},N_{tx})} \right),$$

and, or example, $$e^{-j\phi(N_{tx},1)}$$

may indicate a phase value of an element corresponding to an $N_{tx}$-th row and a first column of the initial beam steering matrix $V_k$. In some embodiments, the first diagonal matrix D may include a phase value of an element of a last row of each column of the initial beam steering matrix $V_k$.

The compressor 22_4 may acquire angle information $\phi$ and $\psi$ for the beam steering matrix $Q_k$ generated by the decomposer 22_2 through Equation 4 to Equation 6, respectively.

("Compression Using Givens–Rotation expression") Equation 4

$$Q_k = \left[ \Pi_{i=1}^{min(N_{ss},N_{tx}-1)} \left[ D_i(1_{i-1}, e^{j\phi_{i,i}}, \ldots, e^{j\phi_{N_r-1,i}}, 1) \Pi_{l=i+1}^{N_{tx}} G_{li}^T(\psi_{li}) \right] \right] \tilde{I}_{N_{tx} \times N_{ss}}$$

In Equation 4, $1_{i-1}$ is a vector composed of 1 having a length of i−1. $\tilde{I}_{N_{tx} \times N_{ss}}$ is an identity matrix having a size of Ntx×Nss.

In Equation 4, $$D_i(1_{i-1}, e^{j\phi_{i,i}}, \ldots, e^{j\phi_{N_r-1,i}}, 1)$$

may be represented as a second diagonal matrix as in Equation 5.

$$D_i(1_{i-1}, e^{j\phi_{i,i}}, \ldots, e^{j\phi_{N_{tx}-1,i}}, 1) = \quad \text{Equation 5}$$

$$\begin{bmatrix} I_{i-1} & 0 & \cdots & \cdots & 0 \\ 0 & e^{j\phi_{i,i}} & 0 & \cdots & 0 \\ \vdots & 0 & \ddots & 0 & 0 \\ \vdots & \vdots & 0 & e^{j\phi_{N_{tx}-1,i}} & 0 \\ 0 & 0 & 0 & 0 & 1 \end{bmatrix},$$

In Equation 4, $G_{li}(\psi)$ is a givens rotation matrix and may be represented as in Equation 6 below.

$$G_{li}(\psi) = \begin{bmatrix} I_{i-1} & 0 & 0 & \cdots & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{N_{tx}-1} \end{bmatrix} \quad \text{Equation 6}$$

The compressor 22_4 may quantize the acquired angle information $\phi$ and $\psi$. In an example embodiment, the phase information generator 22_3 may generate phase information in different ways according to the number of second antennas RX_A1 to RX_An. In one example, when the number of second antennas is 1, the phase information generator 22_3 may generate phases of elements of the first diagonal matrix D used to generate the beam steering matrix $Q_k$ from the initial beam steering matrix $V_k$ as the phase information. In another example, when the number of second antennas is 2 or more, the phase information generator 22_3 may generate phases for maximally reducing a Euclidean distance between beam steering matrices corresponding to adjacent subcarriers or for maximally increasing a cross-correlation between the beam steering matrices as the phase information, as described below in detail.

The compressor 22_4 according to an example embodiment may generate a feedback frame including quantized angle information $\phi$ and $\psi$ and phase information. In the present specification, the quantized angle information $\phi$ and $\psi$ may be referred to as information on a channel estimated by the channel estimator 22_1. The beamformee 22 may transmit the feedback frame to the beamformer 21 through the transceiver 22_7 and the plurality of second antennas RX_A1 to RX_An.

The beamformer 21 may receive the feedback frame from the beamformee 22 through the plurality of first antennas TX_A1 to TX_Am and the transceiver 21_7. The controller 21_1 may control general operations for communication of the beamformer 21. The controller 21_1 may generate a null data packet announcement (NDPA) frame and an NDP which are described below and may process information included in the feedback frame to be used by the beamforming circuit 21_2. A format of the NDPA frame and a format of the feedback frame according to an example embodiment of the inventive concept are described below.

The beamforming circuit 21_2 according to an example embodiment may perform beamforming on the beamformee 22 based on the feedback frame. The beamforming may refer to an operation in which the beamformer 21 determines a beamforming matrix for each subcarrier of a signal transmitted to the beamformee 22. In an example embodiment, the beamforming circuit 21_2 may perform a beamforming operation through use of the phase information and the angle information $\phi$ and $\psi$ of a feedback frame. The beamforming circuit 21_2 may use the phase information to reduce discontinuities between beamforming matrices HF corresponding to adjacent subcarriers, as illustrated in FIG. 2. For example, the beamforming circuit 21_2 may generate an initial beamforming matrix for each subcarrier by using the angle information $\phi$ and $\psi$ and apply the received phase information to the initial beamforming matrix to generate a final beamforming matrix for each subcarrier.

In sum, in the comparative example of FIG. 2, discontinuity of the beamforming matrices HF may be caused by generating the beam steering matrix D by using the first diagonal matrix D as in Equation 3 in the beamformee 22, and thus, as the beamformer 21 receives phase information related to the first diagonal matrix D from the beamformee 22 and reflects the phase information in a beamforming operation, the discontinuity of the beamforming matrices may be reduced.

The beamformer 21 may transmit a signal (or a PPDU) beamformed according to beamforming matrices determined by the beamforming circuit 21_2 to the beamformee 22 through the transceiver 21_7 and the first antennas TX_A1 to TX_Am. The beamformee 22 may process the beamformed signal after performing channel smoothing on the beamformed signal.

Figure 4:
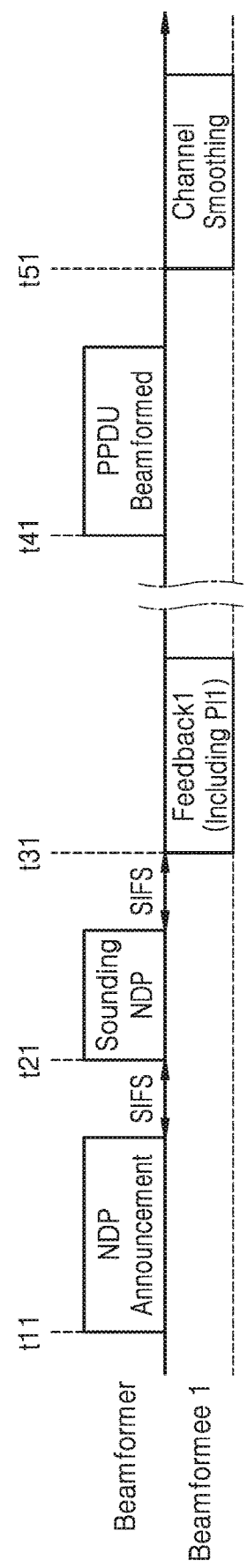
FIG. 4 is a timing diagram illustrating channel sounding according to an example embodiment of the inventive concept.

FIG. 4 is a timing diagram illustrating channel sounding according to an example embodiment of the inventive concept. Specifically, the timing diagram of FIG. 4 illustrates channel sounding performed by a beamformer and a first beamformee. The channel sounding may be based on various protocol standards. In some embodiments, the beamformer may include an access point, and the first beamformee may include a first station. However, FIG. 4 is only an example embodiment of the inventive concept, and the example embodiments of the inventive concept are not limited to the channel sounding of FIG. 4.

Referring to FIG. 4, the beamformer may transmit an NDPA frame to the first beamformee at time tn. For example, the beamformer may transmit an NDPA frame indicating transmission of a sounding NDP to the first beamformer to acquire downlink channel state information. The NDPA frame may include a control frame, and the first beamformee may prepare reception of a sounding NDP based on the NDPA frame. In an example embodiment, the NDPA frame may include a subfield indicating whether or not to request first phase information PI1 from the first beamformee. The first beamformer may determine whether or not to provide the first phase information PI1 to the beamformer as feedback by checking a value of a subfield of the NDPA frame. A specific format of the NDPA frame is described below with reference to FIG. 8.

At time t21, the beamformer may transmit a sounding NDP to the first beamformer. For example, the beamformer may transmit the NDPA frame to the first beamformee and then transmit the sounding NDP to the first beamformee after a short interframe space (SIFS) time. The first beamformee may estimate a first channel (or a first downlink channel) based on the sounding NDP to generate information on the estimated first channel. In an example embodiment, the first beamformer may check that the first phase information PI1 is requested from the subfield of the NDPA frame and generate the first phase information PI1. In addition, in the present specification, the sounding NDP may be interchangeably referred to as an NDP.

At time t31, the first beamformee may transmit a first feedback frame to the beamformer. For example, the first beamformer may receive the sounding NDP and then transmit a first feedback frame including the information on the first channel and the first phase information PI1 estimated after the SIFS time to the beamformer.

At time t41, the beamformer may perform beamforming through use of the first phase information PI1 and the estimated information on the first channel and transmit a beamformed PPDU to the first beamformer based on the determined beamforming matrices.

At time t51, the first beamformer may perform channel smoothing on the beamformed PPDU and then process the beamformed PPDU.

Figure 5:
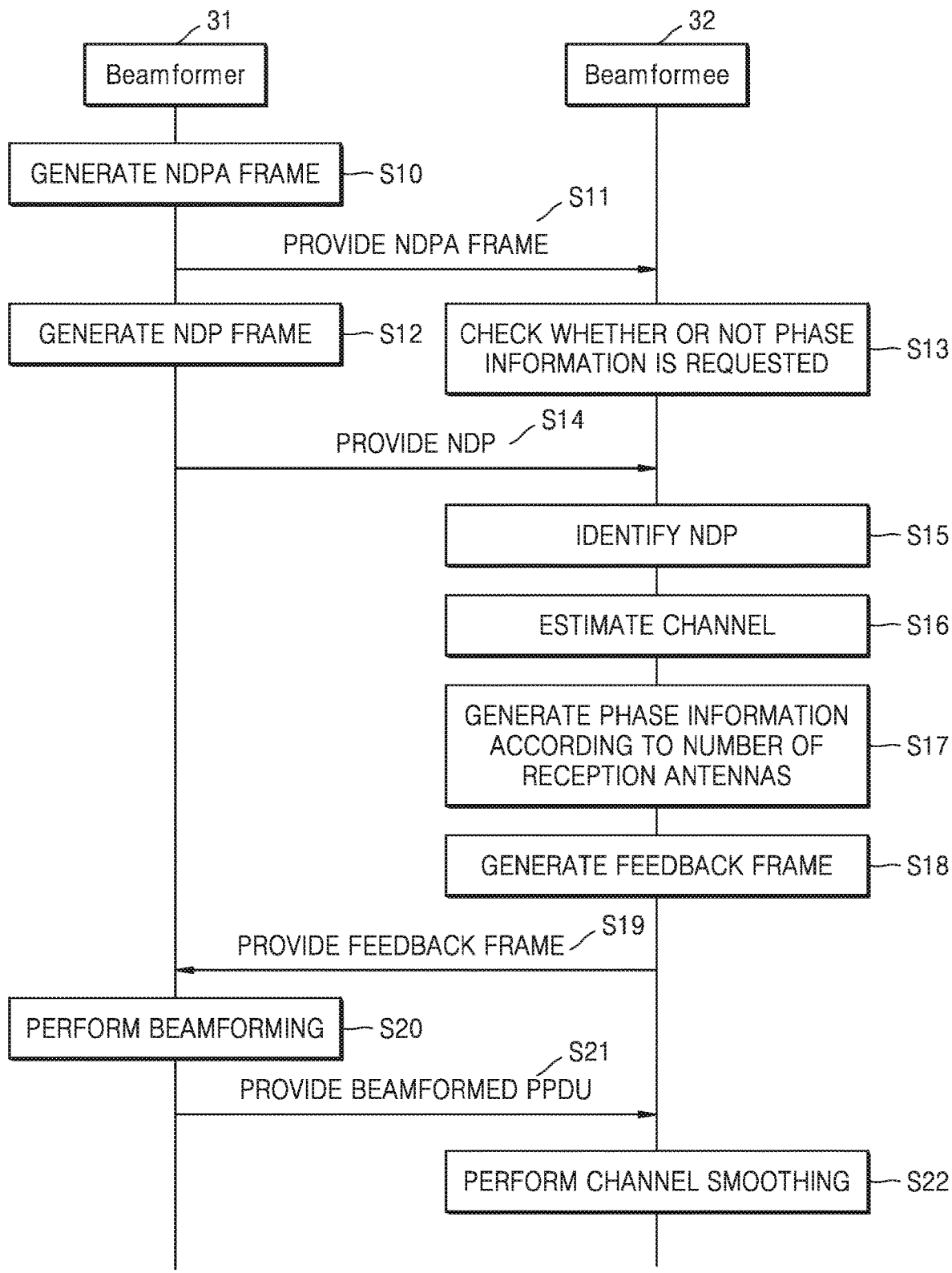
FIG. 5 is a message diagram illustrating a method of channel sounding according to an example embodiment of the inventive concept.

FIG. 5 is a message diagram illustrating a method for channel sounding according to an example embodiment of the inventive concept. Specifically, the message diagram of FIG. 5 illustrates operations of a beamformer 31 as an access point and a beamformee 32 as one of a plurality of stations over time. As illustrated in FIG. 5, the method for channel sounding may include a plurality of operations S10 to S22.

Referring to FIG. 5, in operation S10, the beamformer 31 may generate an NDPA frame. For example, the beamformer 31 may select one beamformee 32 to perform channel sounding (or to provide beamforming) from among associated beamformers and generate an NDPA frame based on the selected beamformee 32. The NDPA frame may include a control frame, and the beamformee 32 may prepare for reception of an NDP based on the NDPA frame. In an example embodiment, the NDPA frame may include a plurality of fields, and any one of the plurality of fields may include a subfield indicating whether or not to request phase information from the beamformee 32.

In operation S11, the beamformer 31 may provide the NDPA frame to the beamformee 32. For example, the beamformer 31 may transmit a PPDU including the NDPA frame generated in operation S10 to the beamformee 32, and the beamformee 32 may receive the PPDU including the NDPA frame from the beamformer 31.

In operation S12, the beamformer 31 may generate an NDP corresponding to the beamformee 32.

In operation S13, the beamformee 32 may check whether or not the beamformer 31 requests phase information from the NDPA frame. In some embodiments, the beamformee 32 may identify a version of the NDPA frame to recognize a protocol standard corresponding to the current NDPA frame. Accordingly, the beamformee 32 may recognize a protocol standard corresponding to the NDP subsequently received from the beamformer 31.

In operation S14, the beamformer 31 may provide the NDP to the beamformee 32.

In operation S15, the beamformee 32 may identify the NDP. That is, the beamformee 32 may extract information (or data) included in fields of the NDP transmitted from the beamformer 31 toward the beamformee 32.

In operation S16, the beamformee 32 may perform channel estimation by using the information extracted from the fields of the NDP.

In operation S17, the beamformee 32 may generate phase information according to the number of reception antennas of the beamformee 32. That is, the beamformee 32 may generate the phase information in different ways according to the number of reception antennas of the beamformee 32. Details on this are described below with reference to FIGS. 6 and 7.

In operation S18, the beamformee 32 may generate a feedback frame including information on the estimated channel and phase information.

In operation S19, the beamformee 32 may provide the feedback frame to the beamformer 31. For example, the feedback frame may include a field in which phase information is located and a field including a subfield having a value indicating presence or absence of the phase information.

In operation S20, the beamformer 31 may extract the information on the estimated channel and the phase information from the feedback frame to perform beamforming through use of the phase information and the information on the estimated channel. As noted earlier, the beamformer 31 may perform the beamforming by generating an initial beamforming matrix for each subcarrier by using the angle information $\phi$ and $\psi$, and apply the phase information to the initial beamforming matrix to generate a final beamforming matrix for each subcarrier. In one example, the beamformer 31 may check presence or absence of phase information through some fields of the feedback frame and acquire the phase information.

In operation S21, the beamformer 31 may provide the beamformee 32 with a beamformed PPDU based on beamforming matrices determined in operation S20 for each subcarrier.

In operation S22, the beamformee 32 may perform channel smoothing on the beamforming matrices corresponding to the beamformed PPDU. Thereafter, the beamformee 32 may process the beamformed PPDU.

Figure 6:
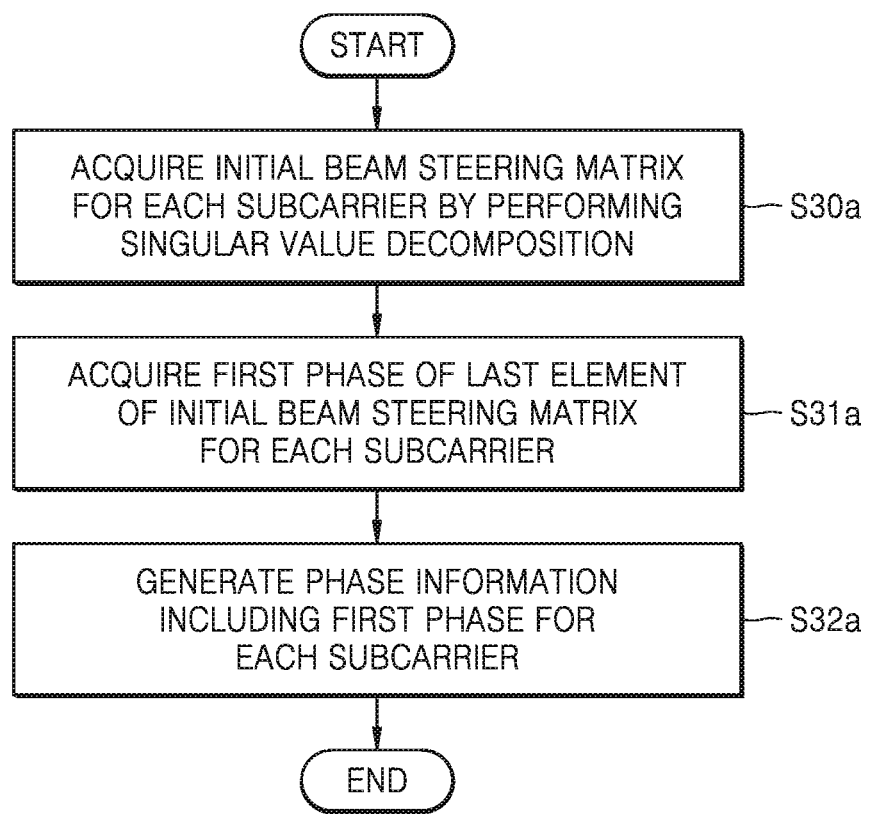
FIGS. 6 and 7 are flowcharts illustrating an example embodiment of operation S17 of FIG. 5.
Figure 7:
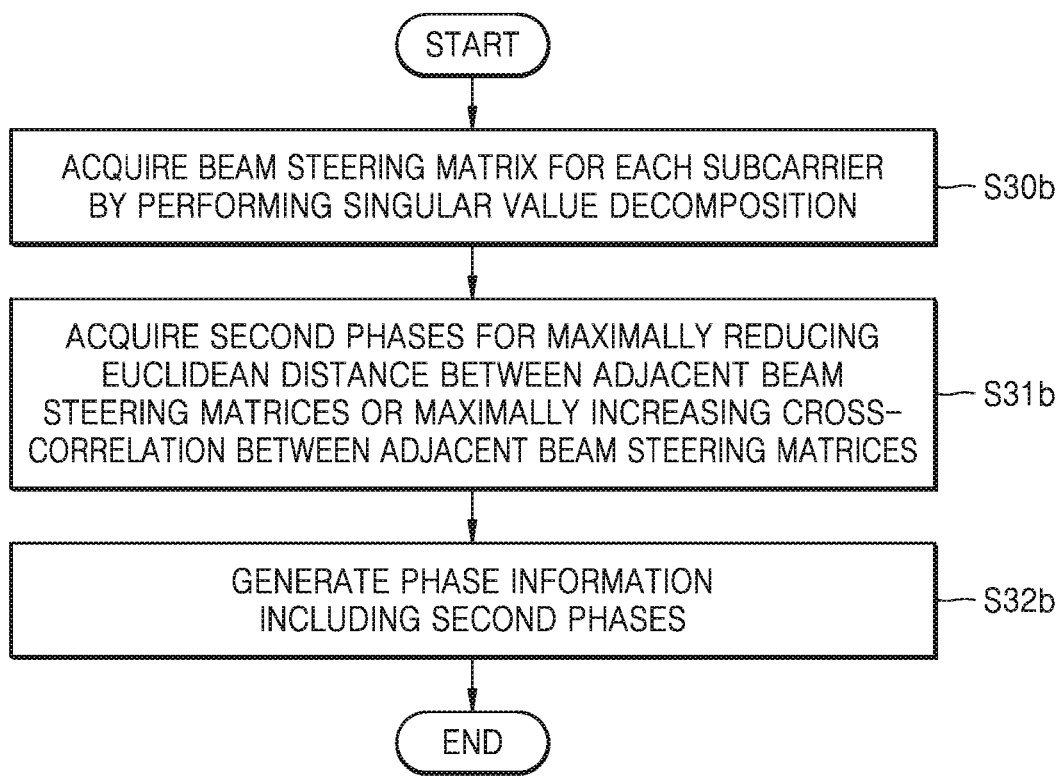

FIGS. 6 and 7 are flowcharts illustrating example embodiments of operation S17 of FIG. 5. Specifically, it is assumed that, in FIG. 6, there is one reception antenna of the beamformee 32, and in FIG. 7, there are a plurality of reception antennas of the beamformee 32. However, FIGS. 6 and 7 are only example embodiments, and the technical idea of the inventive concept is not limited thereto. In the following, FIG. 5 may be further referred to.

Referring to FIG. 6, in operation S30a, the beamformee 32 may perform singular value decomposition on an estimated channel to acquire an initial beam steering matrix for each subcarrier. In operation S31a, the beamformee 32 may acquire a first phase of the last element of the initial beam steering matrix for each subcarrier. Specifically, the beamformee 32 may acquire a first phase of at least one element corresponding to the last row of each column of the initial beam steering matrix for each subcarrier. In operation S32a, the beamformee 32 may generate phase information including the first phase for each subcarrier. For example, the phase information may include information corresponding to the first diagonal matrix D described with reference to FIG. 3.

Referring to FIG. 7, in operation S30b, the beamformee 32 may perform singular value decomposition on an estimated channel to acquire a beam steering matrix for each subcarrier. As described above with reference to FIG. 3, the beam steering matrix may be generated from an initial beam steering matrix. In operation S31b, the beamformee 32 may acquire a second phase for maximally reducing a Euclidean distance between adjacent beam steering matrices or maximally increasing a cross-correlation between the adjacent beam steering matrices.

In an example embodiment, the beamformee 32 may use a Euclidean distance, which is obtained as in Equation 7, between the beam steering matrices (for example, $Q_{k-1}$ and $Q_k$) of two adjacent subcarriers.

$$D_k^{opt} = \arg\min_{D_k} \|\tilde{Q}_{k-1} - Q_k D_k\|, \quad \text{Equation 7:}$$

where $D_k = \text{diag}(e^{j\phi_{N_r,1}}, \ldots, e^{j\phi_{N_r,N_c}})$

In Equation 7, $\|\cdot\|$ is a norm operator, and a diagonal matrix $D_k^{opt}$ in which the Euclidean distance between the beam steering matrices (for example, $Q_{k-1}$ and $Q_k$) of adjacent subcarriers is maximally reduced may be obtained. Hereinafter, it may be represented that Dr is a third diagonal matrix and may be sequentially processed for all subcarriers (k=0, 1, . . . , $N_{FFT}$).

In an example embodiment, the beamformee 32 may use a cross-correlation, which is obtained as in Equation 8, between the beam steering matrices (for example, $Q_{k-1}$ and $Q_k$) of two adjacent subcarriers.

$$D_k^{opt} = \arg\min_{D_k} \text{XCor}(\tilde{Q}_{k-1}, Q_k D_k), \quad \text{Equation 8:}$$

where $D_k = \text{diag}(e^{j\phi_{N_r,1}}, \ldots, e^{j\phi_{N_r,N_c}})$

As in Equation 8, $D_k^{opt}$ in which the cross-correlation between the beam steering matrices (for example, $Q_{k-1}$ and $Q_k$) of two adjacent subcarriers is the greatest may be obtained.

The beamformee 32's feedback operation is based on Equation 7 or Equation 8, where and <<mth3>> is a third diagonal matrix and may be processed sequentially for all subcarriers (k=0, 1, . . . , $N_{FFT}$). For example, when calculating $Q_{k-1}$ for a k-th subcarrier by using Equation 7 or Equation 8, the previously obtained $Q_{k-1}$ may be reflected in the beam steering matrix $Q_{k-1}$ of a k-1-th subcarrier to be represented as $\tilde{Q}_{k-1}$. In an example embodiment, the beamformee 32 may generate second phases of elements of $D_k^{opt}$ for each subcarrier as phase information.

Solutions of Equation 7 and Equation 8 may be defined as in Equation 9.

Equation 9:

$$e^{j\phi_i^{opt}} = \frac{q_{i,k}^h \tilde{q}_{i,k-1}}{|q_{i,k}^h \tilde{q}_{i,k-1}|}$$

In an example embodiment, the second phases may include $\phi_i^{opt}$.

In operation S32b, the beamformee 32 may generate phase information including the second phases.

Figure 8:
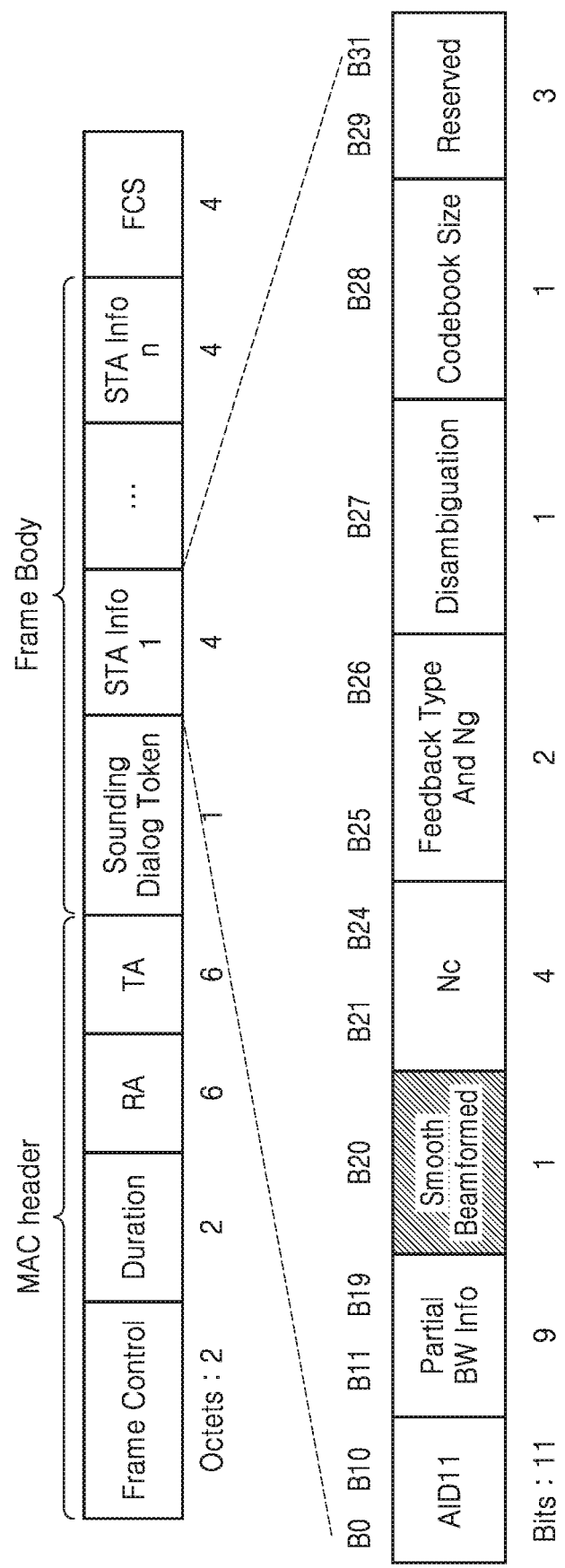
FIG. 8 is a diagram illustrating a null data packet announcement (NDPA) frame according to an example embodiment of the inventive concept.

FIG. 8 is a diagram illustrating an NDPA frame according to an example embodiment of the inventive concept. The NDPA frame may include a media access control (MAC) header, a frame body, and a frame check sequence (FCS) field. In the NDPA frame, the MAC header may include a frame control field, a duration field, an RA field, and a TA field, and the frame body may include a sounding dialog token field and n (where n is an integer greater than zero) STA information fields. The NDPA frame may include information necessary for beamformers to perform channel sounding.

The frame control field may include information on a version of a MAC protocol and other additional control information. The duration field may include time information for setting a network allocation vector (NAV) or information on a user's identifier (for example, an association identifier (AID)). The RA field may include address information of a beamformer that receives the NDPA frame, and the TA field may include address information of a beamformer that transmits the NDPA frame. The sounding dialog token field may also be referred to as a sounding sequence field and may include identification information on the NDPA frame as described below. The STA information field may be referred to as a user information field, and the NDPA frame may include first to n-th STA information fields corresponding to first to n-th beamformees that receive the NDPA frame.

In an example embodiment, the first STA information field may include an "AID11" field in which information on an identifier AID11 for a first STA (or a first user) is located, a "Partial BW Info" field in which partial bandwidth information is located, a "Smooth Beamformed" field in which information on whether or not phase information is requested is located, an "Nc" field in which information on the number of subcarriers is located, a "Feedback Type and Ng" field in which information on a feedback type is located, a "Disambiguration" field, a "Codebook Size" field, and a "Reserved" field. Specifically, a beamformer (or station) that is a target of the first STA information field may check whether or not the beamformer requests phase information by referring to the "Smooth Beamformed" field. A configuration of the first STA information field may also be applied to configurations of remaining STA information fields.

FIG. 9 is a table illustrating information included in a feedback frame according to an example embodiment of the inventive concept. Hereinafter, it is assumed that the feedback frame is based on an EHT protocol standard, but this is only an example embodiment In other embodiments, the feedback frame may be implemented in a format based on various protocols including the EHT+protocol. In addition, some details of fields and subfields in FIG. 9 (and in FIG. 10 discussed below) are described in IEEE 802.11be, and are therefore omitted herein for brevity.

As shown in FIG. 9, a feedback frame generated by a beamformee may include a "Category" field, an "EHT Action" field, an "EHT MIMO Control" field, an "EHT Compressed Beamforming Report" field, an "EHT MU Exclusive Beamforming Report" field, an "EHT CQI Report" field, and an "EHT Smooth Beamforming Report" field, which are sequentially arranged. In an example embodiment, phase information generated by the beamformer according to example embodiments of the inventive concept may be located in the "EHT Smooth Beamforming Report" field.

FIG. 10 shows a frame illustrating an example configuration of an "EHT MIMO Control" field of FIG. 9 The EHT MIMO Control field may include an "Nc Index" subfield, an "Nr Index" subfield, a "BW" subfield, a "Grouping" subfield, a "Codebook Information" subfield, a "Feedback Type" subfield, a "Remaining Feedback Segments" subfield, a "First Feedback Segments" subfield, a "Partial BW Info" subfield, a "Sounding Dialogue Token Number" subfield, and a "Smooth Beamformed" subfield. In an example embodiment, the "Smooth Beamformed" subfield may have a value indicating presence or absence of phase information of a beamformer. For example, when the "EHT Smooth Beamforming Report" field includes phase information, the "Smooth Beamformed" subfield value may be set to "1", and when the "EHT Smooth Beamforming Report" field does not include the phase information, the "Smooth Beamformed" subfield value may be set to "0". A beamformer (or an access point) may check presence or absence of the phase information of the beamformer by referring to the "EHT MIMO Control" field of the feedback frame and may acquire phase information from the "EHT Smooth Beamforming Report" field when it is confirmed that the phase information exists.

FIG. 11 is a table illustrating example phase information located in the "EHT Smooth Beamforming Report" field of FIG. 9.

Referring to FIG. 11, phase information in the "EHT Smooth Beamforming Report" field may include information on a size of an initial beam steering matrix V (or a beam steering matrix Q), information on the number of angles (or phases), and phase values for each subcarrier. As described above, $N_r$ may indicate the number of reception antennas of a beamformer, $N_c$ may indicate the number of subcarriers, and k may indicate an index of a subcarrier.

FIG. 12 is a table diagram illustrating a subfield of an "EHT PHY Capabilities Information" field indicating whether or not smooth beamforming feedback may be supported, according to embodiments of the inventive concept. Hereinafter, the smooth beamforming feedback may indicate that an access point (or a beamformer) receives phase information according to example embodiments of the inventive concept from a station (or a beamformer) to perform beamforming using the phase information.

Referring to FIG. 12, the "EHT PHY Capabilities Information" field defined by IEEE 802.11be may include a subfield indicating whether or not smooth beamforming feedback may be supported. For example, when the access point supports reception of smooth beamforming information feedback including phase information, a corresponding subfield may be set to "1". In addition, in one example, when there is no station capable of supporting transmission of the smooth beamforming information feedback including the phase information, the corresponding subfield may be set to "0".

Figure 13:
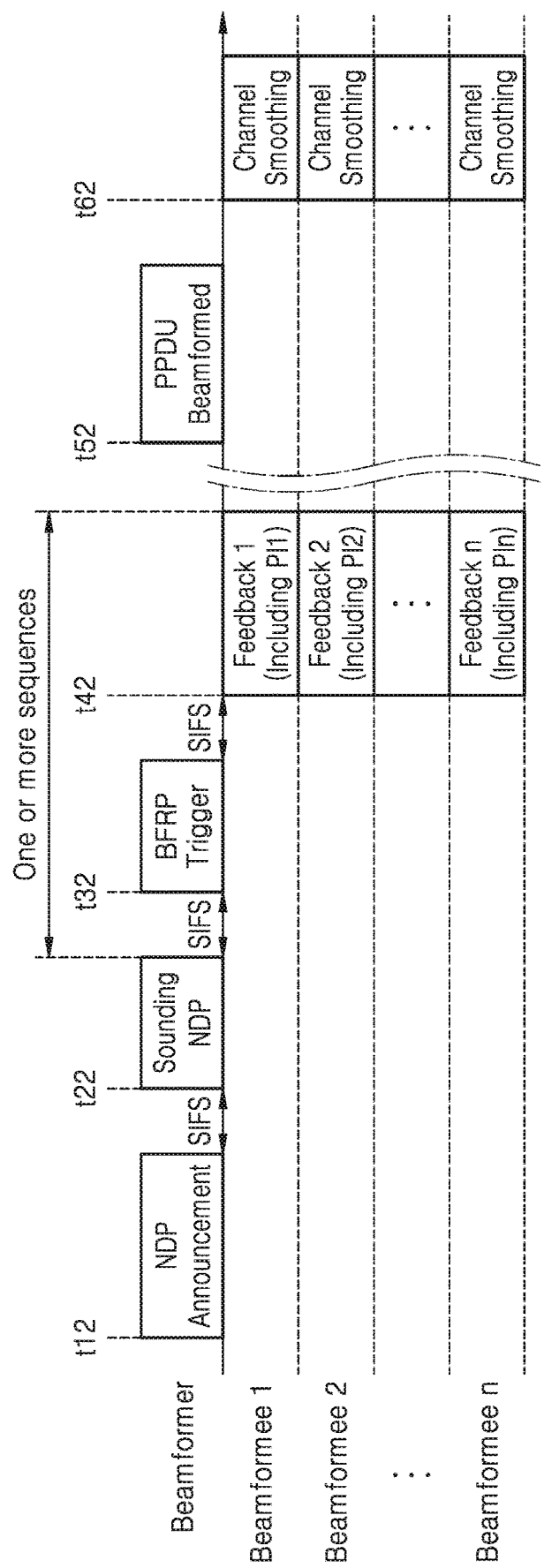
FIG. 13 is a timing diagram illustrating channel sounding according to an example embodiment of the inventive concept.

FIG. 13 is a timing diagram illustrating channel sounding according to an example embodiment of the inventive concept. Specifically, the timing diagram of FIG. 13 illustrates channel sounding performed by a beamformer and first to n-th beamformees (n is an integer greater than 1). In the embodiment of FIG. 13, the first to n-th beamformees may support the same or different protocol standards, respectively. In some embodiments, the beamformer may include an access point, and each of the first to n-th beamformees may include a station. However, the example embodiments of the inventive concept are not limited to the channel sounding of FIG. 13.

Referring to FIG. 13, at time t12, a beamformer may transmit an NDPA frame to the first to n-th beamformees. The first to n-th beamformees may prepare for reception of a sounding NDP based on the NDPA frame. In an example embodiment, the NDPA frame may include subfields indicating whether or not first to n-th phase information PI1 to PIn is requested from the first to n-th beamformees.

At time t22, the beamformer may transmit the sounding NDP to the first to n-th beamformees. For example, the beamformer may transmit the NDPA frame to the first to n-th beamformees and then transmit the sounding NDP to the first to n-th beamformees after an SIFS time. In an example embodiment, the sounding NDP may include first to n-th NDPs respectively corresponding to the first to n-th beamformees, and the first to n-th NDPs may be aggregated in different bands. The first to n-th beamformees may respectively estimate first to n-th channels (or first to n-th downlink channels) based on the sounding NDP to generate information on the estimated first to n-th channels. In an example embodiment, the first to n-th beamformees may respectively check that the first to n-th phase information PI1 to PIn is requested from subfields of the NDPA frame, and respectively generate the first to n-th phase information PI1 to PIn. In some embodiments, some of the first to n-th beamformees may not support an operation of generating phase information or a channel smoothing operation, and in this case, some of the first to n-th beamformees may generate a feedback frame that does not include the corresponding phase information.

At time t32, the beamformer may transmit a beamforming report poll (BFRP) trigger frame to the first to n-th beamformees. For example, an access point may transmit the sounding NDP to the first to n-th beamformees and then provide a BFRP trigger frame for triggering uplink transmission of the first to n-th beamformees to the first to n-th beamformees after an SIFS time. The BFRP trigger frame may include information necessary for the first to n-th beamformees to transmit a feedback frame to a beamformer, e.g., an access point. For example, the BFRP trigger frame may include information on resources to be used in the uplink transmission.

At time t42, after receiving the BFRP trigger frame, the first to n-th beamformees may transmit first to n-th feedback frames to the beamformer after the SIFS time. For example, each of the first to n-th beamformees may generate first to n-th feedback frames including channel information generated by channel estimation and phase information and transmit the first to n-th feedback frames to the beamformer. In an example embodiment, the first to n-th feedback frames may be aggregated in different bands. In some embodiments, the first to n-th feedback frames may be transmitted in bands corresponding to bands in which the first to n-th NDPs are transmitted. For example, the first feedback frame may be transmitted in the band in which the first NDP is transmitted.

At time t52, the beamformer may perform beamforming on the first to n-th beamformees by using the first to n-th phase information PI1 to PIn included in the first to n-th feedback frames and transmit a PPDU beamformed based on a determined beamforming matrix to the first to n-th beamformees. In an example embodiment, the beamformed PPDU may include first to n-th PPDUs respectively corresponding to the first to n-th beamformees, and the first to n-th PPDUs may be aggregated in different bands.

At time t62, the first to n-th beamformees may respectively perform channel smoothing for the first to n-th PPDUs. In some embodiments, a beamformer that does not support channel smoothing among the first to n-th beamformees may not perform the channel smoothing.

Figure 14:
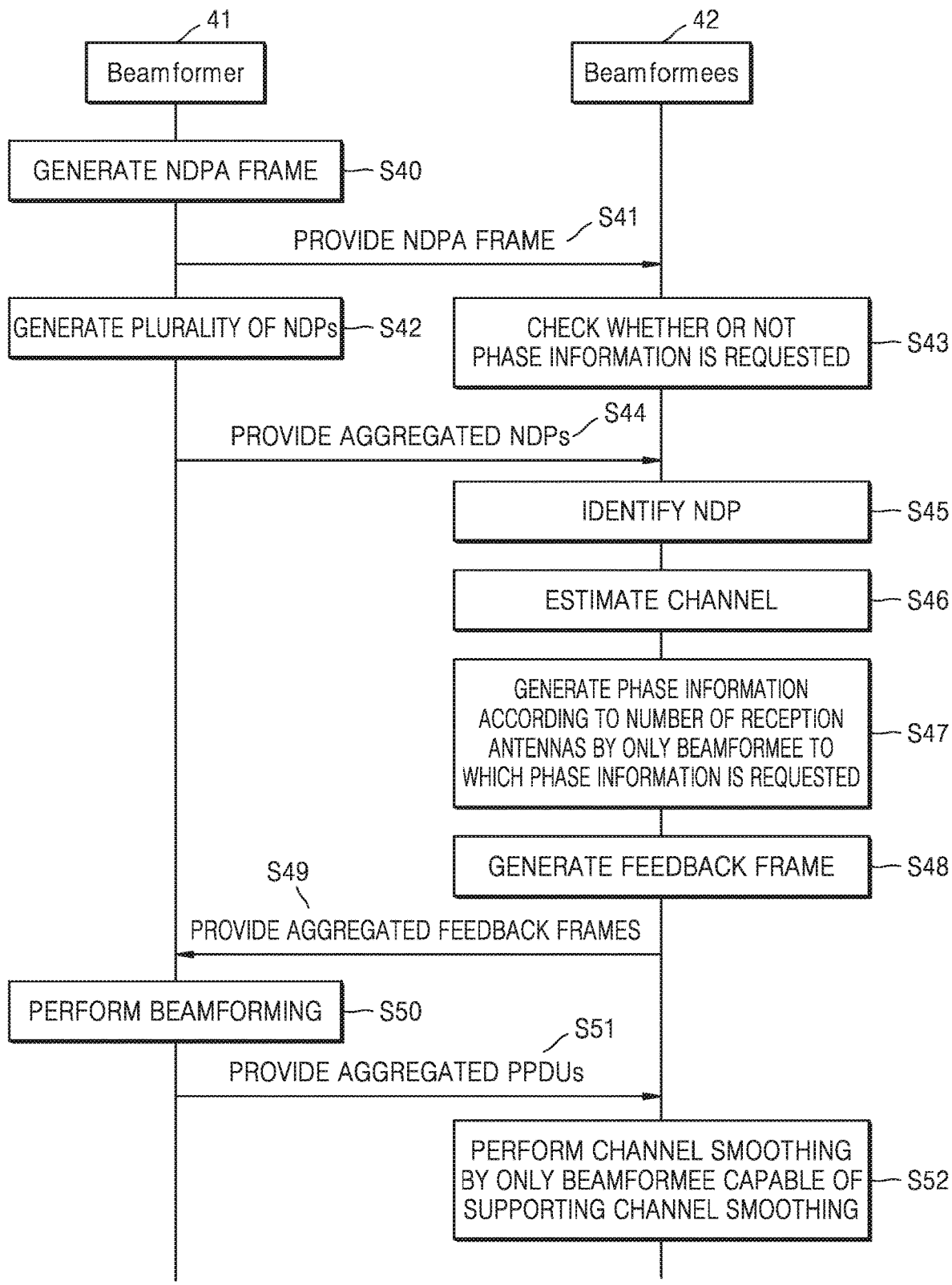
FIG. 14 is a message diagram illustrating a method for channel sounding according to an example embodiment of the inventive concept.

FIG. 14 is a message diagram illustrating a method for channel sounding according to an example embodiment of the inventive concept. As illustrated in FIG. 14, the method for channel sounding may include a plurality of operations S40 to S52.

Referring to FIG. 14, in operation S40, a beamformer 41 may generate an NDPA frame. For example, the beamformer 41 may select a plurality of beamformees 42 to perform channel sounding from among associated beamformers and may generate an NDPA frame based on the selected beamformees 42. In an example embodiment, the NDPA frame may include subfields indicating whether or not to request phase information to each of the beamformees 42.

In operation S41, the beamformer 41 may provide the NDPA frame to the beamformees 42.

In operation S42, the beamformer 41 may generate a plurality of NDPs respectively corresponding to the beamformees 42.

In operation S43, each of the beamformees 42 may check whether or not phase information is requested to each of the beamformers 41 with reference to the NDPA frame.

In operation S44, the beamformer 41 may provide NDPs aggregated respectively in different bands to the beamformees 42.

In operation S45, the beamformees 42 may respectively identify their own NDPs from among the aggregated NDPs.

In operation S46, the beamformees 42 may respectively estimate their own channels by using their own identified NDPs.

In operation S47, among the beamformees 42, only the beamforee to which phase information is requested may generate phase information according to the number of reception antennas.

In operation S48, each of the beamformees 42 may generate a feedback frame.

In operation S49, the beamformees 42 may provide feedback frames respectively aggregated in different bands to the beamformer 41.

In operation S50, the beamformer 41 may perform beamforming with respect to the beamformees 42 based on the feedback frames. The beamformer 41 may perform beamforming in which the phase information in the feedback frame is utilized in conjunction with the angle information.

In operation S51, the beamformer 41 may provide a PPDU in which a plurality of PPDUs are aggregated respectively in different bands based on beamforming matrices determined in operation S50 to the beamformees 42.

In operation S52, among the beamformees 42, only the beamformee capable of supporting channel smoothing may perform channel smoothing for a PPDU thereof.

Figure 15:
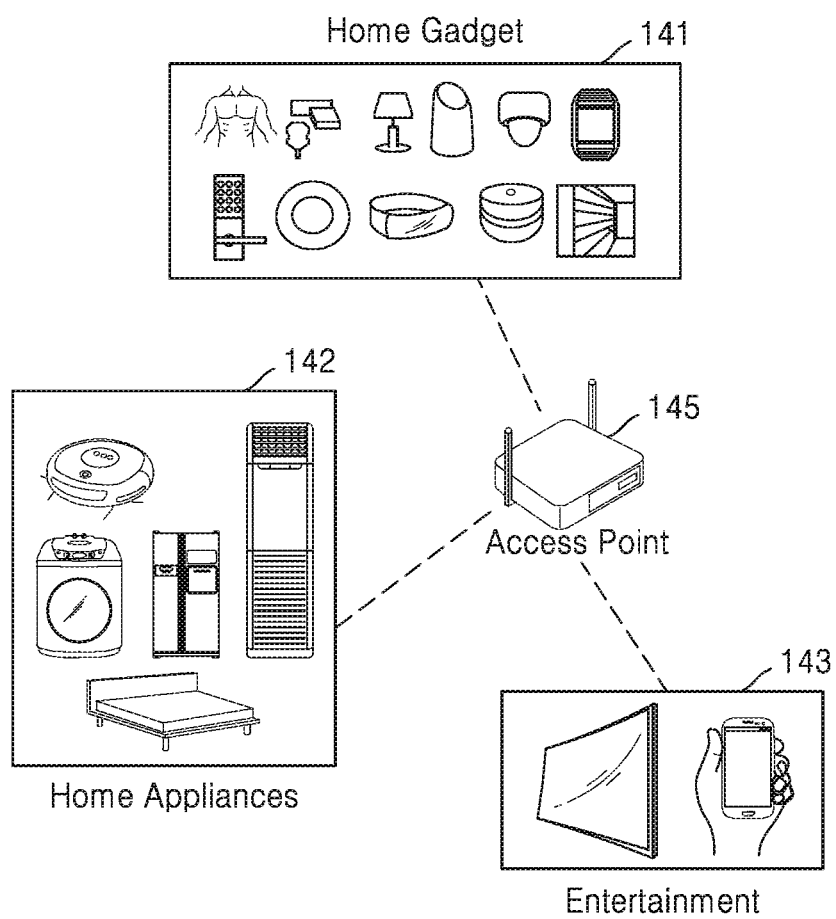
FIG. 15 is a diagram illustrating examples of an apparatus for wireless communication according to an example embodiment of the inventive concept.

FIG. 15 is a diagram illustrating examples of an apparatus for wireless communication according to an example embodiment of the inventive concept. Specifically, FIG. 15 illustrates an Internet of Things (IoT) network system including a home gadget 141, home appliances 142, an entertainment device 143, and an access point 145.

In some embodiments, in the apparatus for wireless communication of FIG. 15, communication based on the NDPA frame described above with reference to the drawings, for example, channel sounding, may be performed. The access point 145 may sequentially provide the NDPA frame and an NDP to the home gadget 141, the home appliances 142, and/or the entertainment device 143. In addition, the home gadget 141, the home appliances 142 and/or the entertainment device 143 may provide the access point 145 with feedback information on a channel based on the NDPA frame and the NDP sequentially received from the access point 145. The feedback information may include phase information according to example embodiments of the inventive concept. The access point 145 may perform beamforming using the phase information for the home gadget 141, the home appliances 142, and/or the entertainment device 143. The home gadget 141, the home appliances 142, and/or the entertainment device 143 may perform channel smoothing on a beamformed signal received from the access point 145.

Various functions described above may be implemented or supported by artificial intelligence technology or one or more computer programs, each of which is composed of computer-readable program code and performed by a computer-readable medium. Terms "application" and "program" refer to one or more computer programs, software components, sets of instructions, procedures, functions, objects, classes, instances, related data, or parts thereof suitable for implementation of appropriate computer-readable program code. The term "computer-readable program code" encompasses computer code of any type including source code, object code, and execution code. The term "computer-readable medium" encompasses any type of medium that may be accessed by a computer, for example, a memory device such as read only memory (ROM), random access memory (RAM), a hard disk drive, a compact disk (CD), a digital video disk (DVD), or any other type of memory. A "non-transitory" computer-readable medium excludes wired communication through which transitory electricity or other signals are transmitted, wireless communication, optical communication, or other communication links. A non-transitory computer-readable medium encompasses a medium in which data may be permanently stored, and a medium in which data may be stored and overwritten later, such as a rewritable optical disk or a removable memory device.

While the inventive concept has been particularly shown and described with reference to embodiments thereof, it will be understood that various changes in form and details may be made therein without departing from the spirit and scope of the following claims.

What is claimed is:

1. A method performed by a first apparatus for communicating with a second apparatus in a wireless local area network (WLAN) system including the first apparatus and the second apparatus, the method comprising:
   transmitting a null data packet (NDP) based on a WLAN protocol to the second apparatus;
   receiving a feedback frame including information on an estimated channel and phase information from the second apparatus in response to the NDP;
     performing beamforming with respect to the second apparatus by reflecting the phase information in the information on the estimated channel; and
     transmitting a beamformed physical layer protocol data unit (PPDU) to the second apparatus,
     wherein the phase information includes information for reducing discontinuity between beamforming matrices corresponding to adjacent subcarriers in a beamformed first PPDU.

2. The method of claim 1, wherein the information on the estimated channel includes angle information on a beam steering matrix for each subcarrier.

3. The method of claim 2, wherein a type of the phase information is based on a number of reception antennas of the second apparatus.

4. The method of claim 2, wherein the phase information includes respective phases of elements corresponding to a last row of each column in an initial beam steering matrix for each subcarrier.

5. The method of claim 2, wherein the phase information includes phases
   for maximally reducing a Euclidean distance between beam steering matrices corresponding to the adjacent subcarriers or for maximally increasing a cross-correlation therebetween.

6. The method of claim 1, further comprising:
   transmitting, by the first apparatus to the second apparatus, a null data packet announcement (NDPA) frame including a subfield indicating whether or not the phase information is requested.

7. The method of claim 6, wherein the subfield is included in a station information field of the NDPA frame.

8. The method of claim 1, wherein the NDP is a first NDP and the protocol is a first protocol, and the method further comprising:
   transmitting, by the first apparatus, a second NDP based on a second WLAN protocol to a third apparatus which is further included in the WLAN system,
   wherein the first NDP and the second NDP are aggregated in different bands.

9. The method of claim 8, wherein the feedback frame is a first feedback frame, and the channel is a first channel, and the method further comprising:
   receiving, by the first apparatus, a second feedback frame including information on an estimated second channel from the third apparatus in response to the second NDP when the third apparatus does not support channel smoothing,
   wherein the first feedback frame and the second feedback frame are aggregated in different bands.

10. The method of claim 9, wherein the PPDU is a first PPDU and the method further comprising:
    performing, by the first apparatus, beamforming with respect to the third apparatus based on the information on the estimated second channel; and
    transmitting, by the first apparatus, a beamformed second PPDU to the third apparatus, wherein the first PPDU and the second PPDU are aggregated in different bands.

11. The method of claim 1, wherein the protocol is the extremely high throughput (EHT) protocol or an EHT compatible protocol.

12. A method performed by a second apparatus for communicating with a first apparatus in a wireless local area network (WLAN) system including the first apparatus and the second apparatus, the method comprising:
    receiving a null data packet (NDP) comprising a plurality of subcarriers, based on a preset protocol from the first apparatus;
    estimating a channel with respect to the first apparatus based on the NDP;
    performing singular value decomposition of the estimated channel;
    generating angle information of a beam steering matrix for each of the subcarriers and channel smoothing-related phase information based on a result of the singular value decomposition; and
    transmitting a feedback frame including the angle information and the channel smoothing-related phase information to the first apparatus.

13. The method of claim 12, wherein, in the beam steering matrix for each subcarrier, elements corresponding to a last row of each column have a real value.

14. The method of claim 12, wherein said performing singular value decomposition of the estimated channel includes acquiring an initial beam steering matrix for each of the subcarriers, and
    said generating the channel smoothing-related phase information includes generating phases of elements corresponding to a last row of each column in an initial beam steering matrix for each of the subcarriers as the channel smoothing-related phase information.

15. The method of claim 12, wherein the second apparatus includes a plurality of reception antennas, and said generating the channel smoothing-related phase information includes generating, as the channel smoothing-related phase information, second phases for maximally reducing a Euclidean distance between beam steering matrices corresponding to mutually adjacent subcarriers or for maximally increasing a cross-correlation between the beam steering matrices.

16. The method of claim 12, further comprising:
    receiving, by the second apparatus, a beamformed physical layer protocol data unit (PPDU) based on the angle information and the channel smoothing-related phase information; and performing, by the second apparatus, channel smoothing on the beamformed PPDU.

17. The method of claim 12, wherein the feedback frame includes a smooth beamforming report field in which the channel smoothing-related phase information is located.

18. The method of claim 12, wherein the feedback frame includes a multi-input multi-output (MIMO) control field in which a subfield having a value indicating presence or absence of the channel smoothing-related phase information is located.

19. A second apparatus configured to communicate with a first apparatus in a wireless local area network (WLAN) system, the second apparatus comprising:
- a transceiver; and
- a processing circuit configured to:
  - estimate a channel with respect to the first apparatus based on a null data packet (NDP) comprising a plurality of subcarriers according to an extremely high throughput (EHT) protocol;
  - generate angle information of a beam steering matrix for each of the subcarriers and channel smoothing-related phase information by performing singular value decomposition of the estimated channel; and
  - transmit a feedback frame including the angle information and the channel smoothing-related phase information to the first apparatus through the transceiver.

20. The second apparatus of claim 19, wherein the second apparatus has exactly one reception antenna and the processing circuit is configured to generate, as the channel smoothing-related phase information, first phases of elements corresponding to a last row of each column in an initial beam steering matrix for each of the subcarriers, acquired from a result of the singular value decomposition.

* * * * *